United States Patent [19]
Haghkar

[11] Patent Number: 5,146,681
[45] Date of Patent: Sep. 15, 1992

[54] ELONGATE VEGETABLE SKIN CLEANER APPARATUS

[76] Inventor: Cyrus Haghkar, 610 Middleton Pl., Norristown, Pa. 19403

[21] Appl. No.: 510,194

[22] Filed: Apr. 16, 1990

[51] Int. Cl.$^5$ .......................... A23N 7/00; A47J 17/00
[52] U.S. Cl. ..................... 30/123.5; 30/299; 30/301; 99/589; 99/590; 99/591
[58] Field of Search ................ 99/541, 540, 591, 590, 99/589, 588, 584, 539, 586, 587, 537; 30/299, 301, 302, 123.5, 123.6

[56] References Cited

U.S. PATENT DOCUMENTS

| | | |
|---|---|---|
| 378,735 | 2/1888 | Sorrels ................... 30/123.5 |
| 1,137,841 | 5/1915 | Cookson ................. 99/590 |
| 1,495,086 | 5/1924 | Lambert ................. 30/123.5 |
| 1,555,476 | 9/1925 | Messer .................. 30/123.5 |
| 2,521,115 | 9/1950 | Calkins .................. 30/299 |
| 2,971,549 | 2/1961 | Langville ................ 99/588 |
| 3,182,397 | 5/1965 | Entenmann ............. 30/301 |
| 4,430,931 | 2/1984 | Hsu ...................... 99/589 |
| 4,545,297 | 10/1985 | Ihlow .................... 99/586 |
| 4,738,195 | 4/1988 | Berube et al. ........... 99/537 |
| 4,982,499 | 1/1991 | Fortin ................... 99/591 |

FOREIGN PATENT DOCUMENTS

| | | | |
|---|---|---|---|
| 1221836 | 7/1966 | Fed. Rep. of Germany | 99/589 |
| 2256899 | 6/1974 | Fed. Rep. of Germany | 99/589 |
| 732258 | 1/1943 | United Kingdom | 99/590 |

*Primary Examiner*—Timothy F. Simone
*Attorney, Agent, or Firm*—Leon Gilden

[57] ABSTRACT

An apparatus for removing a skin layer of elongate vegetables, such as cucumbers and carrots, includes an elongate housing mounting blade segments therewithin. A manually supported embodiment of the invention includes coaxially arranged resilient segments mounting rigid blade members at a lowermost end thereof defining a conical chamber for directing of the vegetables therethrough. The blade segments may be formed of various configurations, such as utilizing triangular projections in association with fluid directing apertures, as well as cylindrical cutters directed interiorly of the blades. The blades define offset cutting elements. The invention further includes a power-driven aspect of the invention utilizing a central cylindrical hopper defining a cylindrical cutting blade coaxially arranged within the chamber, as well as using a helical wire mounting a matrix of spaced needle cutting members projecting interiorly of the cutting chamber to enhance cutting of a vegetable therethrough.

7 Claims, 7 Drawing Sheets

Fig 1

PRIOR ART

Fig 2

PRIOR ART

ELONGATE VEGETABLE SKIN CLEANER APPARATUS

BACKGROUND OF THE INVENTION

1. Field of the Invention

The field of invention relates to vegetable cutting apparatus, and more particularly pertains to a new and improved elongate vegetable skin cleaner apparatus wherein the same permits removal of a skin portion or surface layer of elongate vegetables minimizing removal of an underlying vegetable flesh.

2. Description of the Prior Art

The prior art has presented various skin removal apparatus for removal of vegetable skin, as well as skin associated with fish and the like, wherein a relatively thin skin layer is protective of an underlying flesh for consumption. Vegetable skinning apparatus of the prior art has in past usage been of a relatively cumbersome organization, or has utilized structure tending to remove flesh along with the aforenoted skin of a vegetable. Further, due to the various geometric configurations and non-symmetrical arrangement of elongate vegetables, an apparatus is required to accommodate the undulations and variations in geometric alignment of elongate vegetables. Examples of the prior art include U.S. Pat. No. 2,884,658 to Johnson wherein the patent sets forth a rotary head underlying an air manifold to direct air under pressure past the rotary head during a fish cleaning procedure.

U.S. Pat. No. 1,444,975 to Maine sets forth a potato peeler wherein a plurality of cooperative rotors peel a potato skin relative to a potato.

U.S. Pat. No. 3,026,612 to Szczepanski sets forth a potato peeler utilizing a rotary head mounted relative to a handle.

U.S. Pat. Nos. Des. 254,048 and 270,891 are illustrative of rotary peeling devices utilized in the prior art.

As such, it may be appreciated that there continues to be a need for a neew and improved elongate vegetable skin cleaner apparatus wherein the same addresses both the problems of ease of use, as well as effectiveness in removal of a skin covering relative to an elongate vegetable and accommodating various geometrical variations between such vegetables and as such, the present invention substantially fulfills this need.

SUMMARY OF THE INVENTION

In view of the foregoing disadvantages inherent in the known types of vegetable cleaning apparatus now present in the prior art, the present invention provides an elongate vegetable skin cleaner apparatus wherein the same provides a manual or powered structure to provide relative rotation of blades relative to a vegetable directed within the hand structure. As such, the general purpose of the present invention, which will be described subsequently in greater detail, is to provide a new and improved elongate vegetable skin cleaner apparatus which has all the advantages of the prior art vegetable cleaning apparatus and none of the disadvantages.

to attain this, the present invention provides an apparatus for removing a skin layer of elongate vegetables, such as cucumbers and carrots, including an elongate housing mounting blade segments therewithin. A manually supported embodiment of the invention includes coaxially arranged resilient segments mounting rigid blade members at a lowermost end thereof defining a conical chamber for directing of the vegetables therethrough. The blade segments may be formed of various configurations, such as utilizing triangular projections in association with fluid directing apertures, as well as cylindrical cutters directed interiorly of the blades. The blades define offset cutting elements. The invention further includes a power-driven aspect of the invention utilizing a central cylindrical hopper defining a cylindrical cutting blade coaxially arranged within the chamber, as well as using a helical wire mounting a matrix of spaced needle cutting members projecting interiorly of the cutting chamber to enhance cutting of a vegetable therethrough.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademarks Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved elongate vegetable skin cleaner apparatus which has all the advantages of the prior art vegetable cleaning apparatus and none of the disadvantages.

It is another object of the present invention to provide a new and improved elongate vegetable skin cleaner apparatus which may be easily and efficiently manufactured and marketed.

It is a further object of the present invention to provide a new and improved elongate vegetable skin cleaner apparatus which is a durable and reliable construction.

An even further object of the present invention is to provide a new and improved elongate vegetable skin cleaner apparatus which is susceptible of a low cost of manufacture with regard to both materials and labor, and which accordingly is then susceptible of low prices of sale to the consuming public, thereby making such elongate vegetable skin cleaner apparatus economically available to the buying pulic.

Still yet another object of the present invention is to provide a new and improved elongate vegetable skin cleaner apparatus which provides in the apparatuses and methods of the prior art some of the advantages thereof, while simultaneously overcoming some of the disadvantages normally associated therewith.

Still another object of the present invention is to provide a new and improved elongate vegetable skin cleaner apparatus wherein the same utilizes a coaxially aligned head member mounting a series of blades segments therewithin for removal of a vegetable skin relative to an associated vegetable.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 to 16 thereof, a new and improved elongate vegetable skin cleaner apparatus embodying the principles and concepts of the present invention and generally designated by the reference numerals 10, 10a, 10b, and 10c will be described.

Figure 1:
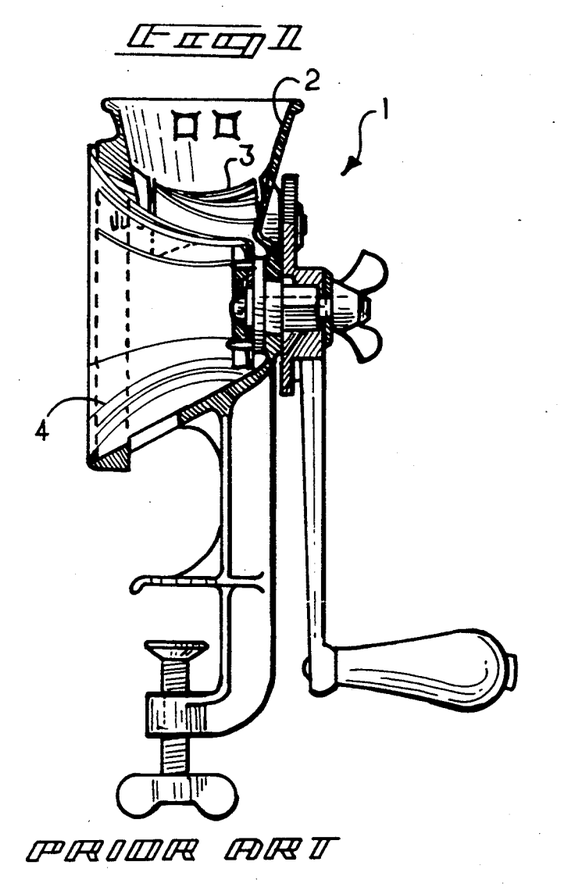
FIG. 1 is an orthographic side view, partially in section, of a prior art vegetable cleaning apparatus.
Figure 2:
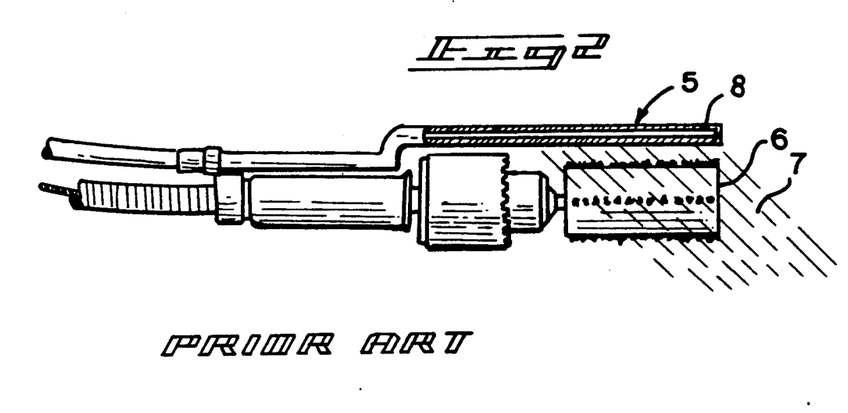
FIG. 2 is an orthographic side view, taken in elevation, of a further prior art skin cleaning apparatus.
Figure 3:
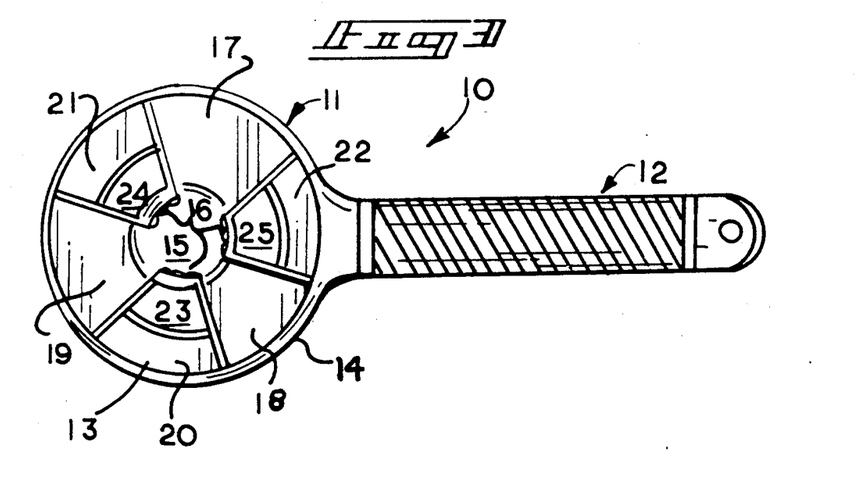
FIG. 3 is an orthographic top view of the instant invention.

FIG. 1 illustrates a prior art vegetable skin removal apparatus 1, wherein the apparatus is utilized to remove skin from potatoes that are directed within a hopper 2, and are peeled between a first rotary member 3 and a second rotary member 4. FIG. 2 illustrates a further prior art skin removal apparatus 5 wherein a rotary head 6 is in communication with pressurized air 7 received and directed from an overlying manifold 8.

Figure 5:
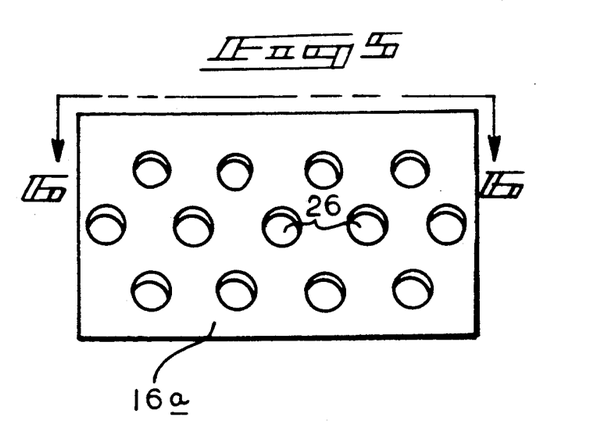
FIG. 5 is an orthographic frontal view, taken in elevation, of a cutter segment utilized by the instant invention.
Figure 6:
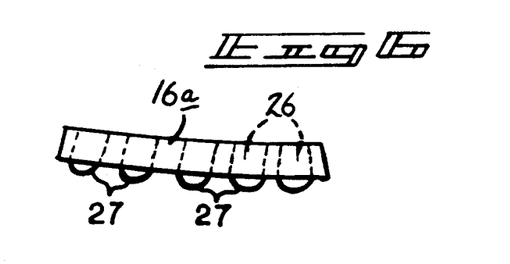
FIG. 6 is an orthographic top view of the cutter segment, as illustrated in FIG. 5.
Figure 7:
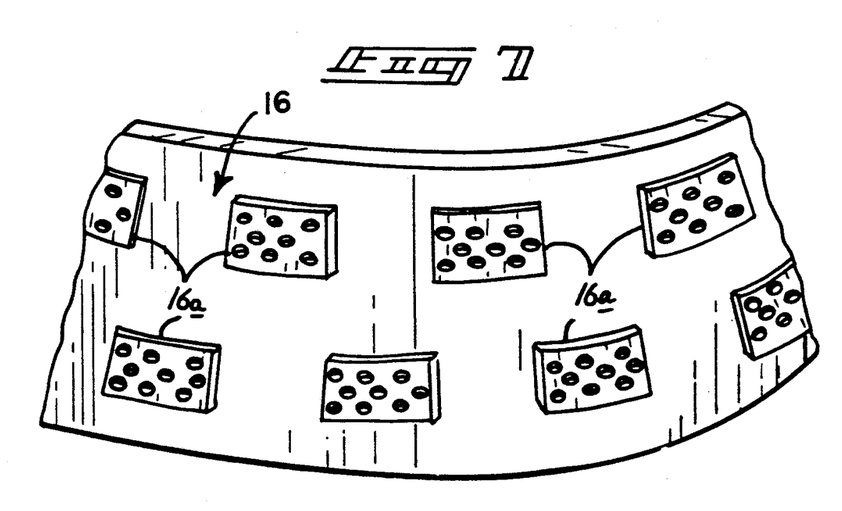
FIG. 7 is an orthographic view, taken in elevation, of a blade sector utilized within the apparatus, as illustrated in FIG. 3.

More specifically, the elongate vegetable skin cleaner apparatus 10 of the instant invention essentially comprises a cleaning head 11 defined by a cylindrical body 13, including a handle 12 diametrically aligned with an annular entrance 14 defining an uppermost terminal end of the cylindrical body 13. The cylindrical body 13 includes a bottom expandable exit opening 15 (see FIG. 3) that is expandable from approximately within a class of vegetables, such as cucumbers, carrots, and the like. An annular aligned series of blade sectors 16 are mounted to define the exit opening 15 and each define sixty degrees of arc, with sixty degrees of annular spacing defined between each of the blade sectors 16. A first, second, and third respective conical resilient web segments 17, 18, and 19 is directed downwardly from the top annular entrance 14 to a forward edge in alignment, and positioned medially between each of the blade sectors 16 to define the exit opening 15. A third, fourth, and fifth conical resilient web segments 20, 21, and 22 extends downwardly from the top annular entrance 14 to a position medially between adjacent conical web segments. Specifically, the third conical web segments 20 extends downwardly and medially of the second and third conical webs 18 and 19, while the fourth conical web 21 extends downwardly and medially of the first and third conical web segments 17 and 19, while the fifth conical web segments 22 extends downwardly and medially of the first and second conical web segments 17 and 18. The third, fourth, and fifth conical web segements 20, 21, and 22 also define sixty degrees of arc, and further define a respective spacing or opening between a lower end of the third, fourth, and fifth conical web segments and a blade sector 16. Specifically, a first, second, and third conical opening 23, 24, and 25 is defined between a lowermost edge of the third, fourth, and fifth respective conical webs 20, 21, and 22 and a downwardly positioned and spaced blade sector 16. FIG. 7 illustrates a typical blade sector 16 defining an arc of substantially sixty degrees, and including a matrix of blade segments 16a, as illustrated in FIGS. 5 and 6. The blade segments are arranged in an upper and lower row, wherein the blade segments are offset relative to one another from the top row to the bottom row, where a blade segment of a bottom row is positioned medially of a plurality of segments of a top row. Each of the blade segments 16a includes a cutting bore 26 directing therethrough, with a projecting cutting annulus 27 projecting forwardly of a forward surface of each of the segments. The rows are arranged parallel to one another and offset, as illustrated in FIG. 7.

Figure 8:
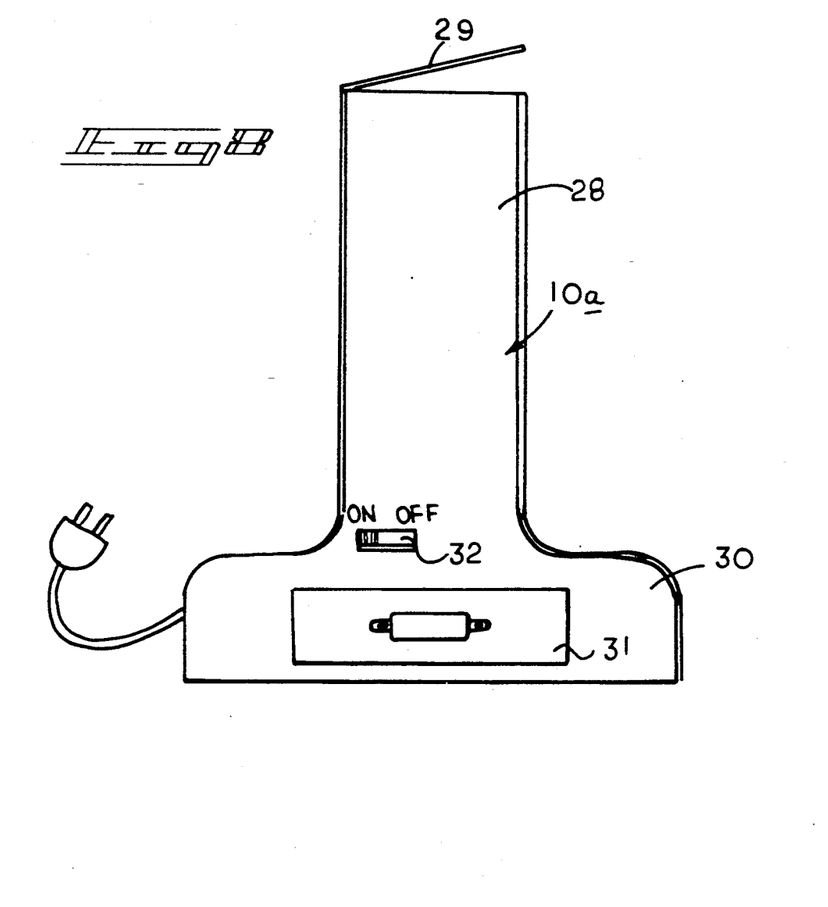
FIG. 8 is an orthographic side view, taken in elevation, of a mechanized aspect of the instant invention.
Figure 15:
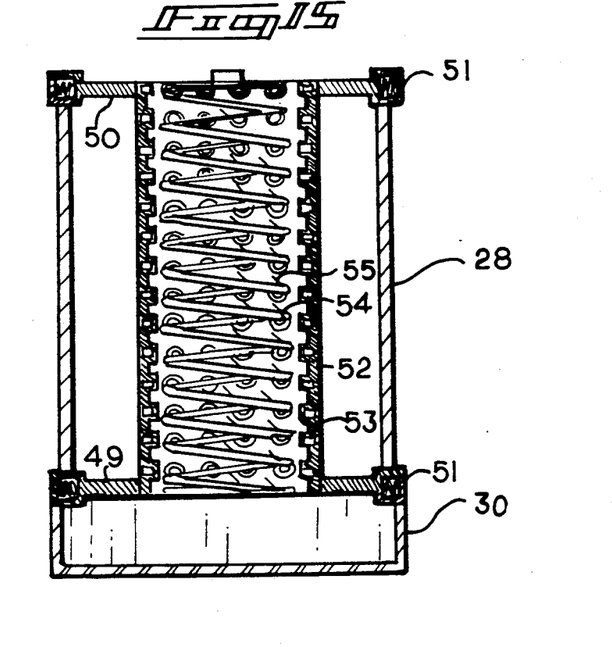
FIG. 15 is an orthographic cross-sectional view of the organization, as illustrated in FIG. 8.
Figure 16:
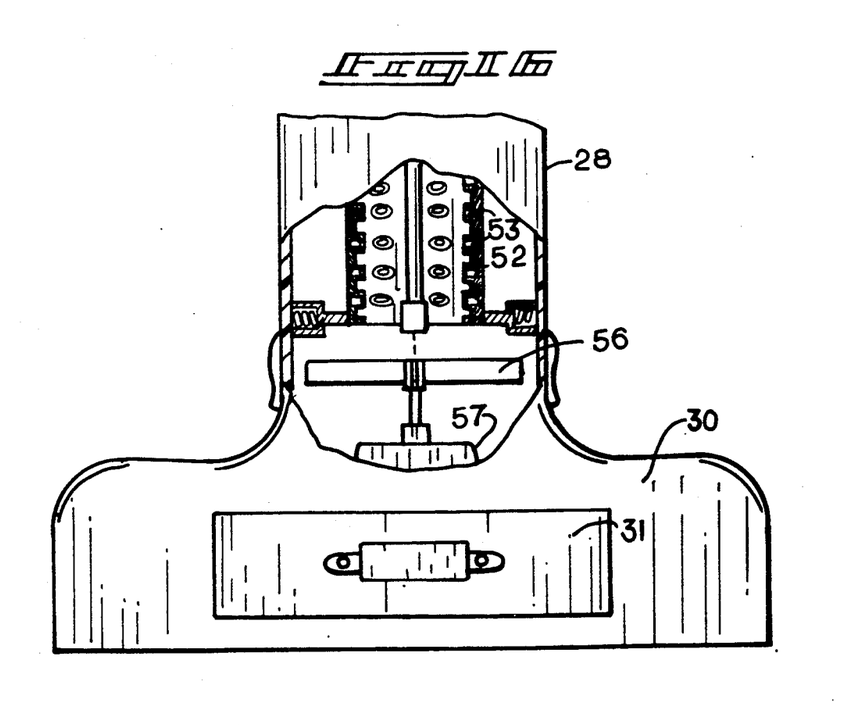
FIG. 16 is an orthographic frontal view, partially in section, of the organization as illustrated in FIG. 8.

FIG. 8 illustrates a modified skin cleaner apparatus 10a, including a cylindrical hopper 28, with a lid 29 pivotally mounted thereto, with a base 30 mounting a removable clean-out tray 31. The hopper 28, as illustrated in FIGS. 15 and 16, includes a rigid top web 50 and a resilient bottom web 49 mounting a coaxially aligned cylindrical cutter plate 52 coaxially aligned with the hopper 28. The cutter plate 52 includes a matrix of cutter tubes 53 directed interiorly and diametrically aligned with the cutter plate 52. Further, the cylindrical cutter plate 52 includes a series of biasing springs 51 to mount and bias the respective top and bottom webs 50 and 49 to minimize vibration in use of the organization. A helical spring 54 is directed interiorly and coaxially aligned with the cylindrical cutter tube 53 and includes a series of cutter needles 55 directed interiorly of the helical spring 54, wherein directing of an elongate vegetable through the cutter tube 52, a helical spring 54 accommodates varying geometric configurations of such vegetables. Further, the cylindrical cutter plate 52 is formed of annular segments, wherein the bottom and top webs 49 and 50 are also utilized to bias such segments interiorly and coaxially of the hopper 28. A slicing blade 56 is coaxially aligned and underlying a position relative to the cutter plate 52 operative through a motor 57 powered by conventional alternating current. Residue from a cleaning operation, as well as slices directed past the slicing blade 56, are received within the tray 31 removable from the base 30 for access to vegetable slices and the like contained within the tray 30 subsequent to use of the device 10a.

Figure 4:
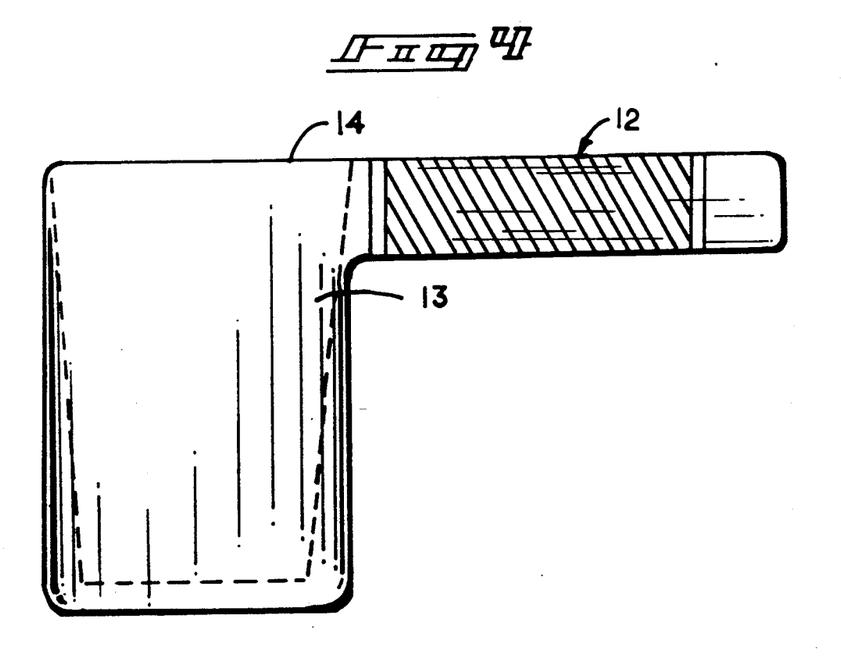
FIG. 4 is an orthographic side view of the invention, as illustrated in FIG. 3.
Figure 9:
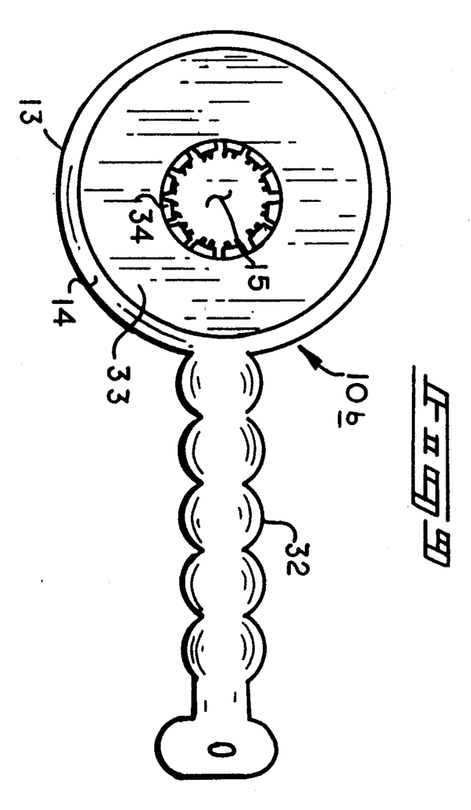
FIG. 9 is an orthographic top view of a modified manually manipulatable skin cleaning apparatus as utilized by the instant invention.
Figure 10:
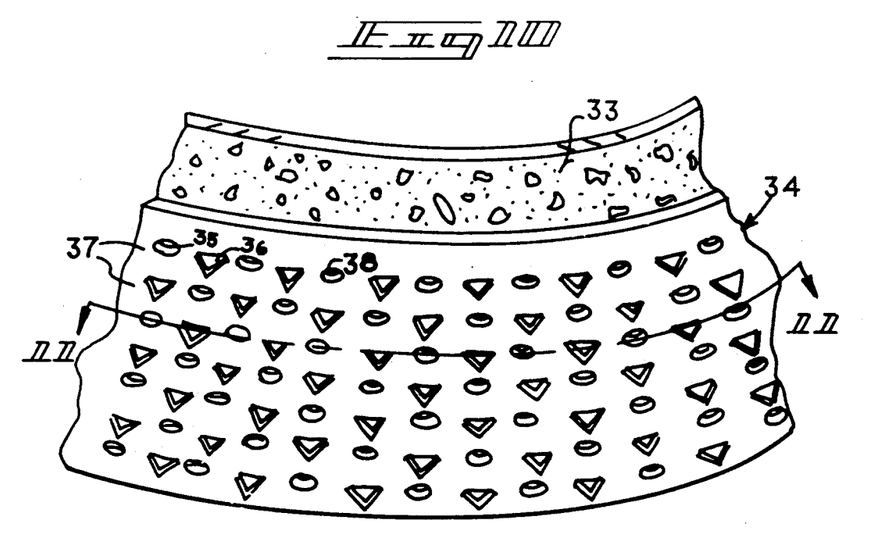
FIG. 10 is an orthographic frontal view, taken in elevation, of a blade sector as utilized by the apparatus illustrated in FIG. 9.
Figure 11:
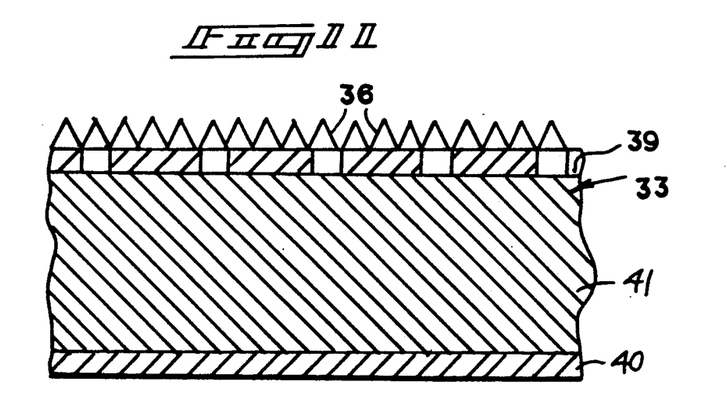
FIG. 11 is an orthographic top view of the blade structure, as illustrated in FIG. 10.

FIG. 9 illustrates a modified manual skin cleaner apparatus 10b, wherein a ribbed handle 32 is diametrically aligned with the top annular entrance 14 defining an upper end of a cylindrical body 13 of a configuration, as illustrated in FIG. 4. A conical diaphragm 33 extends from the annular entrance 14 downwardly to the exit opening 15 which is generally aligned with the lower terminal end of the cylindrical body 13. An annular aligned series of conical cutter segments 34 are mounted at a lower terminal end of the diaphragm 33, wherein each includes an alternating series of through-extending bores 35, with triangular cutting projections 36. The bores and projections 35 and 36 respectively comprise plural rows, with colums 38 aligning alternating bores and cutting projections 35 and 36 respectively, as illustrated in FIG. 10. The diaphragm 33 is formed with a lower rigid ring 39 mounted to the upper terminal edge of the conical cutter segment 34 and an upper rigid ring 40 mounted to the annular entrance 14, with a polymeric memory retentent resilient conical web 41 extending coextensively between the upper and lower rings 40 and 39 respectively. The upper and lower rings are preferably formed of a semi-rigid polymeric material to enhance the maintaining of the geometric integrity of the conical disphragm 33 in use during the rotative passage of an elongate vegetable through the exit opening 15.

Figures 12, 12A:
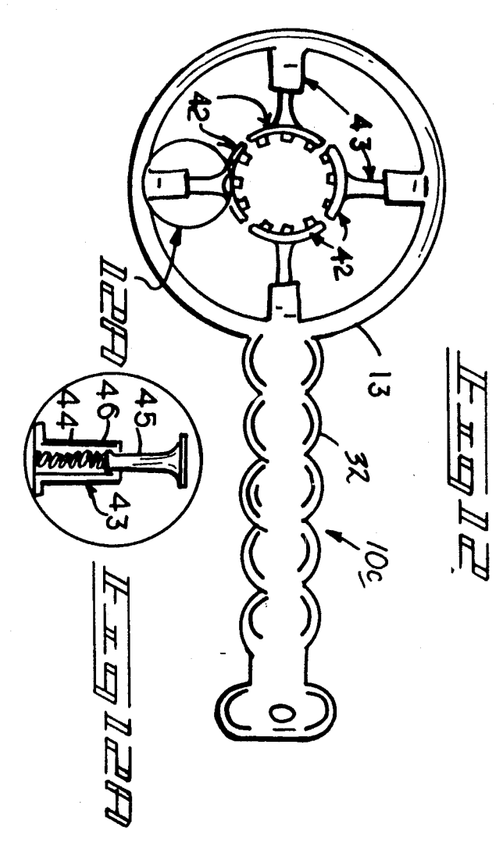
FIG. 12 is an orthographic top view of a further modified manually manipulatable vegetable skin removal apparatus.
FIG. 12a is an enlarged orthographic cross-sectional view of the section 12a as illustrated in FIG. 12.
Figure 13:
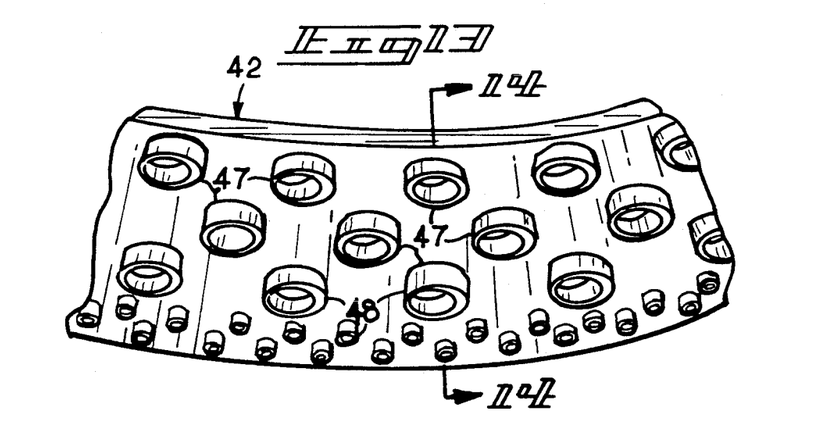
FIG. 13 is an orthographic front view, taken in elevation of a blade sector, as utilized by the apparatus, as illustrated in FIG. 12.
Figure 14:
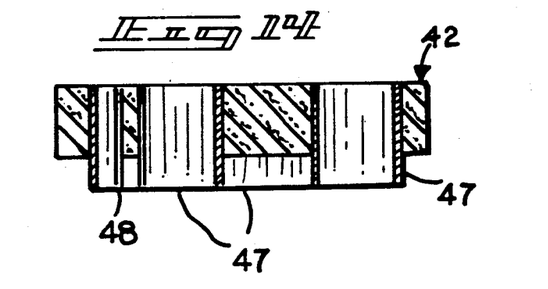
FIG. 14 is an orthographic cross-sectional view, taken along the lines 14—14 of FIG. 13 in the direction indicated by the arrows.

FIG. 12 illustrates a further modified manual cleaner apparatus 10c, wherein the cylindrical body 13 mounts at a ninety degree spacing of arc relative to one another a series of biasing legs 43. The biasing legs 43 each oncludes a support cylinder 44 integrally and diametrically aligned within an interior surface of the cylindrical body 13 biasing exteriorly of the support cylinder 44, a reciprocatable leg 45 coaxially aligned with each support cylinder 44 and biased in an extended position relative to the support cylinder 44 by a spring 46 captured between a rearwardly positioned terminal end of the reciprocatable leg 45 at a forward end of the spring 46. Each of the reciprocatable legs 45 mounts a cylindrical blade segment 42 thereon, wherein the cylindrical blade segments define a cylindrical central cavity coaxially aligned with the cylindrical body 13. Each of the blade segments 42 define substantially ninety degrees of arc and include plural rows of offset cutting cylinders, wherein the top three rows of offset first cutter cylinders 47 defined by a first diameter overlying a plurality of second rows of offset second cutter cylinders 48 are of a second diameter less than the first diameter. The individual cutter cylinders of each of the rows are offset relative to an underlying row and are spaced apart at equal spacing relative to one another.

As to the manner of usage and operation of the instant invention, the same should be apparent from the above disclosure, and accordingly no further discussion relative to the manner of usage and operation of the instant invention shall be provided.

With resoect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows;

1. An elongate vegetable skin cleaner apparatus comprising, on combination,
   a cleaning head, the cleaning head including a longitudinally aligned cylindrical body, the cylindrical body including an annular entrance opening, and
   cutting means mounted within the cylindrical body coaxially aligned therewith for receiving elongate vegetables therethrough, and
   the cutting means includes a first, second, and third conical resilient web segment, each first, second, and third conical resilient web segment includes an annular upper end spaced above and fixedly mounted interiorly of the cylindrical body and fixedly secured to the annular entrance opening, and each first, second, and third conical resilient web segment includes an annular lower end, wherein each annular lower end of each of the first, second, and third resilient web segment defines a conical segment, wherein each conical segment is annularly displaced relative to one another to define an exit opening, and a fourth, fifth, and sixth conical resilient web segment each including an upper annular end mounted to the annular entrance opening, wherein the fourth, fifth, and sixth conical resilient web segments are spaced apart relative to one another sixty degrees of arc, and wherein the first, second, and third conical resilient web segments are spaced apart by sixty degrees of an arc.

2. an apparatus as set forth in claim 1 wherein the first, second, and third resilient web segments mount a respective blade sector at the annular entrance opening, wherein the blade sector of each first, second, and third conical resilient web is secured between adjacent first, second, and third resilient web segments.

3. An apparatus as set forth in claim 2 wherein each blade sector includes a plurality of blade segments mounted thereon, including an upper row of blade segments and a lower row of blade segments, wherein the upper row of blade segments is offset relative to the lower row of blade segments such that each blade segment of the lower row of blade segments is positioned medially of a plurality of blade segments of the first row of blade segments.

4. An apparatus as set forth in claim 1 wherein the cutting means includes a single conical diaphragm, the diaphragm including an upper annular diaphragm end mounted integrally and coextensively with the annular entrance opening, and including a lower diaphragm end, the lower diaphragm end coaxially aligned with the cylindrical body, and further aligned with a lower terminal end of the cylindrical body, and the lower diaphragm end including an annular array of equally spaced conical cutter segments mounted thereon.

5. An apparatus as set forth in claim 4 wherein each conical cutter segment includes a plurality of rows of cutter members, each cutter member defining a projecting triangular cutting edge directed interiorly of the exit opening, and wherein each triangular cutting edge includes a through-extending bore positioned adjacent each triangular cutting edge, and each triangular cutting edge is further spaced above a through-extending bore of an underlying row.

6. An apparatus as set forth in claim 5 wherein the conical diaphragm further includes a relatively rigid upper ring fixedly mounted to the entrance oprning, and an annular lower rigid ring mounted to each cutter segment, and a relative resilient polymeric retentent web formed between the lower and upper rings.

7. An apparatus as set forth in claim 1 wherein the cutting means includes a series of biasing legs mounted interiorly of the cylindrical body arranged at ninety degrees relative to one another and diametrically aligned relative to one another, wherein each biasing leg includes a support cylinder integrally and diametrically aligned and mounted to an interior surface of the cylindrical body, wherein the support cylinder includes a reciprocatable leg and a spring member mounted within the support cylinder underlying each reciprocatable leg to normally bias each reciprocating leg exteriorly from each support cylinder, and each reciprocatable leg includes a blade segment mounted thereon, each blade segment defining an arc of substantially ninety degrees, and each blade segment including a plurality of offset rows of first cutter cylinders, the first cutter cylinders defined by a first diameter, and further including a plurality of rows of offset second cutter cylinders underlying the first cutter cylinders, the second cutter cylinders defined by a second diameter, and the first cutter cylinders definedd by a first diameter, wherein the second diameter is substantially less than that of the first diameter.

* * * * *